United States Patent [19]

Yearsley

[11] 4,046,036
[45] Sept. 6, 1977

[54] BAR FEED MECHANISM FOR LATHES

[75] Inventor: Norman Yearsley, Kenilworth, England

[73] Assignee: Wickman Machine Tool Sales Limited, Coventry, England

[21] Appl. No.: 626,377

[22] Filed: Oct. 28, 1975

[30] Foreign Application Priority Data

Nov. 14, 1974 United Kingdom ............... 49264/74

[51] Int. Cl.² .................... B23B 13/00; B23B 3/36
[52] U.S. Cl. ..................................... 82/2.7; 82/34 A
[58] Field of Search ............... 82/2.5, 2.7, 34 A, 38 R

[56] References Cited

U.S. PATENT DOCUMENTS

| 3,095,130 | 6/1963 | Schultz | 82/2.7 X |
| 3,131,587 | 5/1964 | Spohn et al. | 82/2.7 |
| 3,147,653 | 9/1964 | Jones, Jr. | 82/2.7 |
| 3,677,114 | 7/1972 | Brochard | 82/38 R |
| 3,720,119 | 3/1973 | Gilbert et al. | 82/2.7 |
| 3,875,830 | 4/1975 | Lechot | 82/2.7 |

FOREIGN PATENT DOCUMENTS 1,235,110 2/1967 Germany ................. 82/2.5

Primary Examiner—Harrison L. Hinson
Attorney, Agent, or Firm—Holman and Stern

[57] ABSTRACT

A bar feed mechanism for a lathe comprising a pair of bar feed devices spaced lengthwise of the bar feed path, and switches adjacent the devices respectively to sense the presence or absence of bar, the bar feed devices being alternatively operable to feed the bar through the lathe and being arranged only to feed the bar if a section of bar spaced from an end thereof is situated in a position to be fed.

6 Claims, 6 Drawing Figures

BAR FEED MECHANISM FOR LATHES

BACKGROUND OF THE INVENTION

This invention relates to lathes of the kind in which bar stock is fed progressively through a collet which is actuated to grip the stock to allow production of workpieces one after another from the protruding end of the bar. The invention is moreover applicable to single or to multi spindle lathes.

Bar feed mechanisms which have been proposed and used include discs for feeding the bar through the machine by rotation of the discs. Relative rotation between the discs and the bar stock produces damage to the surface of the bar stock, when the disc surfaces are hard, though where the disc surfaces are soft to overcome this, the disc surfaces themselves become damaged by contact with burrs or other projections on the bar. Such burrs or projections are particularly to be found at the bar ends. This problem is particularly acute in machines having apparatus by means of which the bar is overfed and subsequently pushed backwards against the direction of rotation of the discs.

SUMMARY OF THE INVENTION

It is the object of this invention to provide a bar feed mechanism for a lathe in a form which minimizes damage both to the bar stock and to the bar contacting disc surfaces.

In accordance with the present invention a bar feed mechanism for a lathe comprises a pair of bar feed devices spaced lengthwise of the feed path of bar stock in the lathe, and control means for alternatively actuating the two bar feed devices, the control means reacting to the presence or absence of an end of a bar adjacent to either of the bar feed devices respectively, the control means ensuring the bar feed devices are at all times out of engagement with the ends of the bar stock.

BRIEF DESCRIPTION OF THE DRAWINGS

The invention will now be described by way of example with reference to the accompanying drawings in which.

DETAILED DESCRIPTION OF PREFERRED EMBODIMENT

Figure 1:
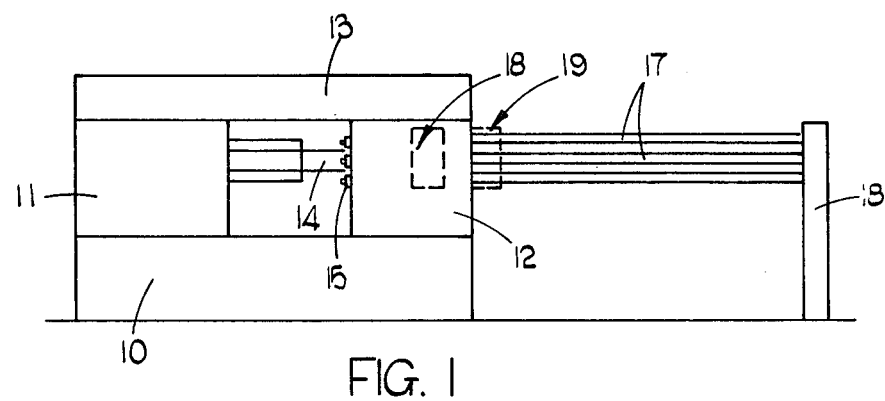
FIG. 1 is a diagrammatic representation of a multi spindle lathe incorporating the present invention.

With reference to FIG. 1, there is shown diagrammatically a multi spindle lathe, comprising a base 10 on which are mounted two housings 11, 12, which are connected by a bridge structure 13. A main tool block support spindle 14 extends between the housings 11, 12 and the lathe incorporates tool slides and other apparatus, which however, have been omitted for clarity since they form no part of this invention.

WIthin the housing 12, is mounted a spindle drum containing a number of independently rotatable spindles indicated generally at 15. Six or eight work spindles 15 are commonly provided.

Each spindle incorporates a releasable collet identified generally at 16 in FIGS. 3 to 6.

The lathe is fed with bar stock 17, to each work spindle, each bar being carried in a stock tube 17a, these tubes comprising a magazine which is mounted on a support 18 at the rear of the machine.

The stock may be round sectioned bar, as shown in the drawings, or bar of non circular cross section or tube.

The machine incorporates a bar feed mechanism for advancing the bar stock through the collets incrementally for the production of a series of workpieces from the ends of the bars extending out of the collets into the space between the housing 11 and 12.

The bar feed mechanism is positioned adjacent to one of the stations occupied by the work spindles respectively, so as to feed the bars through their respective collets in turn as they occupy that station.

The bar feed mechanism comprises a pair of bar feed devices 18, 19 which are spaced apart lengthwise of the direction of bar feed which is indicated by the arrow 20. The bar feed devices 18, 19 comprise pairs of discs 21, 22 respectively. The discs of each pair are mounted upon concentric spindles for rotation by drive means (not illustrated). The axes of these spindles are perpendicular to axis of the bar stock and collet and offset therefrom.

Figure 3:
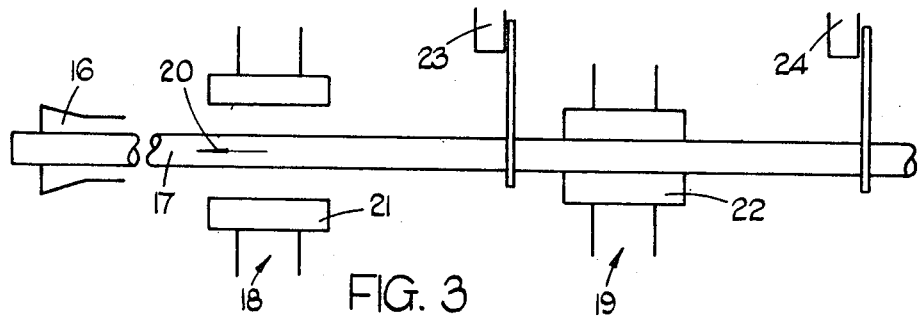
FIG. 3 is a representation of the bar feed mechanism shown in a position for feeding a long bar.

The discs are moreover movable axially with respect to their spindle axes, between bar engaging and releasing positions respectively. In FIG. 3 for example the device 19 is shown with its discs 22 in bar engaging positions and the device 18 is shown with its discs 21 in bar releasing positions.

Figure 2:
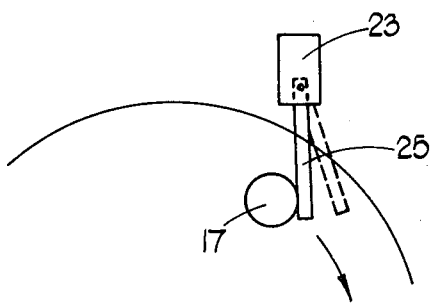
FIG. 2 is an enlarged fragmentary view showing one of the switches (sensing means) of the bar feed mechanism.

Disposed between the devices 18, 19 there is a first control switch 23 and, at a position spaced from the device 19 and at the opposite side thereof from the device 18, there is a further control switch 24. FIG. 2 shows one of the control switches 23. The switch comprises a body fixed with respect to the housing 12 and having a pivotable arm 25 engageable with the stock bar 17.

As the spindle drum is indexed during the operating cycle of the machine to bring one of the spindles with its bar stock into the station previously referred to, the bar stock 17 engages the arm 25 of the switch 23, thus actuating the switch. The switch 24 is similarly actuated.

Associated with the switches 23, 24 and with the drive for the bar feed devices 18, 19 there is a control unit (not illustrated) which ensures the sequence of operations to be described.

The operational sequence, commencing with a new bar, comprises indexing the spindle drum so that a work spindle with its bar stock is positioned to actuate the two switches 23, 24. At this point the bar is long enough to contact both the switch arms as shown in FIG. 3. Contact with the switches 23, 24 causes the discs 22 of the bar feed device 19, to be moved to their bar engaging positions. Rotation of the discs advances the bar through the collet 16 which, for this purpose, is opened. Next the collet 16 is closed and the bar feed device 19 is either stopped or moved to its bar releasing position.

The bar feed device 18 remains inoperative during these operations.

As the machine cycle continues the spindle drum will be rotated to a new position in which another work spindle with its bar stock will be positioned in the station. The operations just described will be repeated.

Figure 4:
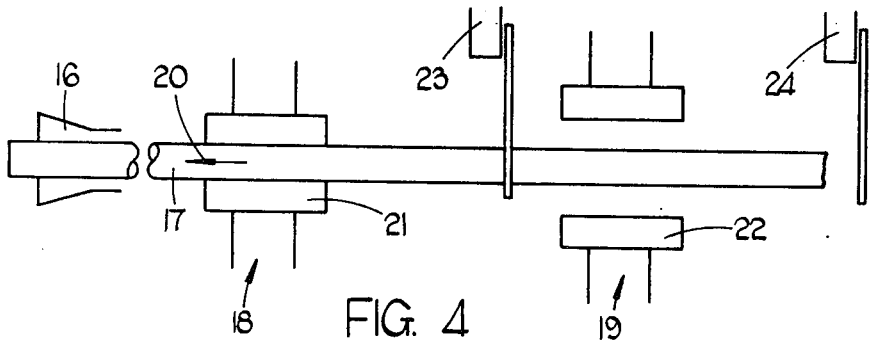
FIG. 4 is a similar view to FIG. 3 showing the mechanism in a position for feeding a shorter bar.

However, when the bar stock 17, is so shortened that its end no longer contacts the switch arm of the switch 24 as shown in FIG. 4, a different sequence of operations will take place. The bar feed device 18 will be actuated into the bar engaging position of the discs 21 thereof, and feed of the bar will be accomplished thereby. At this time the bar feed device 19 will remain inoperative.

Figure 5:
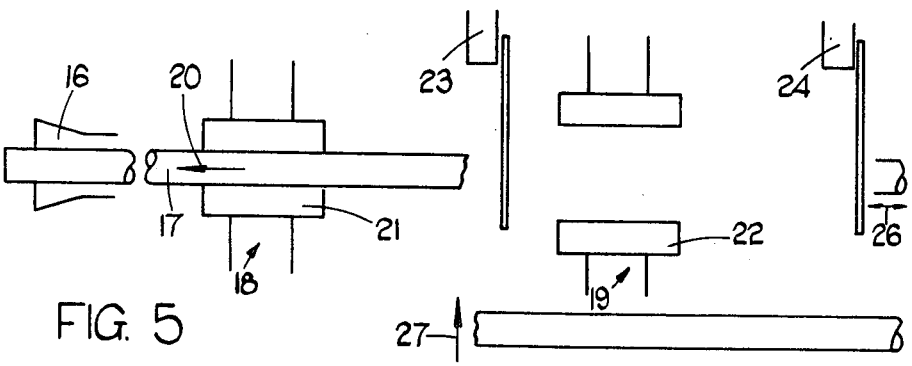
FIG. 5 is a similar view to FIG. 3 showing the mechanism in a position in which further feed of the bar ceases to allow for insertion of a new bar in either of two alternative directions as shown in the figure.

When the bar has been so far advanced that its end will contact neither the switch 24 nor the switch 23 as shown in FIG. 5, the absence of a signal from either of these switches will stop the machine, thus, indicating to an operator that new bars are required.

The bar stock will be manually introduced axially through the magazine tubes or in an alternative construction automatically introduced laterally from a rack to the feed tubes. These alternatives are indicated by the arrows 26, 27 respectively in FIG. 5. In order to prevent an operator ignoring the reload signal, the signal can be used to cause the feed discs to be retracted.

Figure 6:
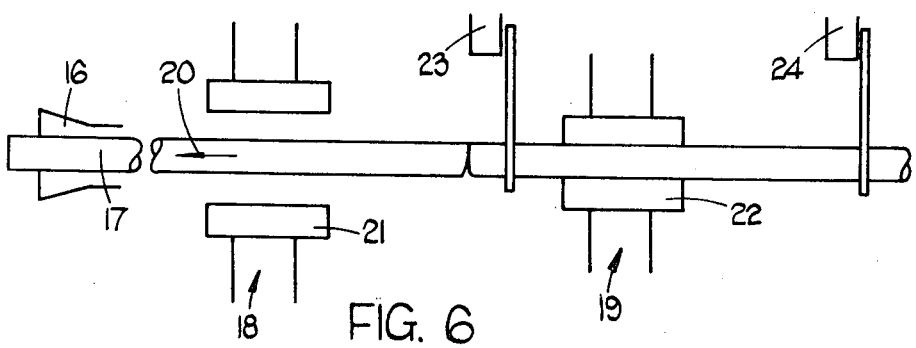
FIG. 6 is a similar view to FIG. 3 showing the mechanism in a position for recommencing feeding of the bar, a new bar following.

When a new bar has been inserted to the position shown in FIG. 6 the two switches 23, 24 will be contacted, thus actuating the bar feed device 19 and causing the bar feed device 18 to remain inoperative.

With this arrangement contact between the driving discs of the bar feed devices and ends of bar stock which may be malformed or sharp edged is eliminated. Furthermore, it is possible to use soft surfaces for the discs 21, 22 of the bar feed devices to minimize damage by the discs on the bars. The spacing of the switches 23, 24 with respect to the bar feed devices 18, 19 is determined by the maximum length of a component that may be machined at each incremental advancement of a bar, though over travel to allow correct positioning is also accommodated.

Though the bars are supported in tubes 17a the bar is exposed adjacent to the feed device 19 so that the discs can contact the bar.

The discs may be circular or generally D-shaped. Where D-shaped discs are used, they are stopped at positions at which they are out of contact with the bar, except, when bar feeding is to be carried out.

The discs may be replaced by rollers for bar engagement and these may be mounted upon retractable arms to allow indexing of the spindle drum.

The invention may also be applied to single spindle lathes.

However in both single and multispindle lathes the switches may be of the proximity type particularly when the bar section is non-circular.

I claim:

1. A bar feed mechanism for a lathe comprising a pair of bar feed devices spaced lengthwise of the feed path of bar stock in the lathe, and control means for alternatively actuating the two bar feed devices, the control means including two means for sensing the presence or absence of an end of a bar, the two sensing means being disposed adjacent the two bar feed devices respectively, the control means ensuring alternative actuation of the devices in such manner that the bar feed devices are at all times out of engagement with ends of the bar stock.

2. The bar feed mechanism as claimed in claim 1 in which each of the bar feed devices comprises a pair of rotatable discs which can be positioned to engage opposite sides of a bar to be fed.

3. The bar feed mechanism as claimed in claim 2 in which the discs of each bar feed device are mounted for rotation about concentric axes perpendicular to and off set from the axis of the bar stock to be fed.

4. The bar feed mechanism as claimed in claim 2 in which the discs of each of the bar feed devices are movable towards and away from each other to occupy bar engaging and bar releasing positions.

5. The bar feed mechanism as claimed in claim 1 in which each of the two sensing means consists of a switch, the absence of a bar at the switch position furthermost from a collet of the lathe providing a signal for actuation of the bar feed device adjacent to the other switch and retraction of the other bar feed device.

6. The bar feed mechanism as claimed in claim 5 in which the switches are provided with respective arms arranged to engage with bar stock when this is present in appropriate position.

* * * * *